US012109663B2

(12) United States Patent
Ahonen

(10) Patent No.: US 12,109,663 B2
(45) Date of Patent: Oct. 8, 2024

(54) METHOD IN DRY-SHAKE COATING OF A CONCRETE FLOOR

(71) Applicant: CONCRIA OY, Ylöjärvi (FI)

(72) Inventor: Mika Ahonen, Kyröskoski (FI)

(73) Assignee: CONCRIA OY, Ylöjärvi (FI)

( * ) Notice: Subject to any disclaimer, the term of this patent is extended or adjusted under 35 U.S.C. 154(b) by 664 days.

(21) Appl. No.: 17/298,244

(22) PCT Filed: Sep. 3, 2019

(86) PCT No.: PCT/FI2019/050622
§ 371 (c)(1),
(2) Date: May 28, 2021

(87) PCT Pub. No.: WO2020/109650
PCT Pub. Date: Jun. 4, 2020

(65) Prior Publication Data
US 2022/0088736 A1    Mar. 24, 2022

(30) Foreign Application Priority Data

Nov. 30, 2018   (FI) .................................... 20186027

(51) Int. Cl.
| | |
|---|---|
| *C04B 41/52* | (2006.01) |
| *B24B 1/00* | (2006.01) |
| *B24B 7/18* | (2006.01) |
| *C04B 41/50* | (2006.01) |
| *C04B 41/70* | (2006.01) |
| *C04B 41/00* | (2006.01) |

(52) U.S. Cl.
CPC ................. *B24B 1/00* (2013.01); *B24B 7/18* (2013.01); *C04B 41/5089* (2013.01); *C04B 41/52* (2013.01); *C04B 41/70* (2013.01); *C04B 41/00* (2013.01)

(58) Field of Classification Search
CPC ...... E04F 15/12; E04F 21/24; C04B 41/4539; C04B 41/4545; C04B 41/4547; C04B 41/4549; C04B 41/4905; C04B 41/5024; C04B 41/5035; C04B 41/52; C04B 41/524; C04B 41/68
See application file for complete search history.

(56) References Cited

U.S. PATENT DOCUMENTS

| | | | |
|---|---|---|---|
| 2,277,203 A | 3/1942 | Boult | |
| 4,366,209 A * | 12/1982 | Babcock | ............... C04B 41/508 106/695 |
| 5,441,677 A | 8/1995 | Phillips, Sr. | |
| 6,155,907 A * | 12/2000 | Jones | .................. C04B 41/5089 451/60 |
| 6,454,632 B1 * | 9/2002 | Jones | .................... C04B 41/009 451/60 |
| 6,475,067 B1 * | 11/2002 | Jones | ..................... B24B 55/06 451/353 |
| 6,780,369 B1 * | 8/2004 | Darrow | ................. E04F 21/242 264/333 |
| 7,588,483 B1 | 9/2009 | Allen, Jr. et al. | |
| 9,267,284 B2 * | 2/2016 | Shaw | ..................... E02D 27/32 |
| 2002/0059776 A1 * | 5/2002 | Harvey | ................... C04B 41/70 52/741.41 |
| 2004/0159073 A1 * | 8/2004 | Palermo | ................. C04B 41/72 52/745.19 |
| 2005/0175782 A1 | 8/2005 | Graf | |
| 2014/0227950 A1 | 8/2014 | Ahonen | |
| 2015/0299041 A1 | 10/2015 | Wetherell et al. | |
| 2018/0215968 A1 | 8/2018 | Corsaro | |

FOREIGN PATENT DOCUMENTS

| | | | | |
|---|---|---|---|---|
| CN | 101886457 A | 11/2010 | | |
| CN | 104032930 A | 9/2014 | | |
| CN | 104829198 A | 8/2015 | | |
| CN | 105246828 A | 1/2016 | | |
| CN | 105862543 A | 8/2016 | | |
| CN | 205893847 U | 1/2017 | | |
| CN | 107587398 A | 1/2018 | | |
| CN | 108071056 A | 5/2018 | | |
| CN | 108529974 A | 9/2018 | | |
| EP | 3587374 A1 * | 1/2020 | ............. | C04B 28/16 |
| GB | 9724605 | 1/1998 | | |

(Continued)

OTHER PUBLICATIONS

Concrete Decor. Understanding the Unique Properties of Hardeners and Densifiers. vol. 7, No. 5, Aug. 2007. Retrieved from https://www.concretedecor.net/departments/concrete-placing/hardenersdensifiers/ on Jan. 26, 2024. (Year: 2007).*

Curecrete.com. Enhancing the Performance of Concrete Floors through the Use of Concrete Densifiers. AIA-CDI02 Presentation Notes. Jan. 5, 2020. Retrieved from https://curecrete.com/wp-content/uploads/AIA-CDI02-Presentation-Notes.pdf on Jan. 26, 2024. (Year: 2020).*

International Search Report and Written Opinion in corresponding International Application No. PCT/FI2019/050622 dated Feb. 18, 2020 (9 pages).

(Continued)

*Primary Examiner* — William P Fletcher, III
(74) *Attorney, Agent, or Firm* — Jeffri A. Kaminski; Venable LLP

(57) ABSTRACT

A method in dry shake coating of a concrete floor is provided. On top of the concrete floor two or more superimposed dry shake material layers are applied. The surface of an underlying dry shake layer is troweled prior to application of a next dry shake layer, whereafter the lastly processed dry shake layer of a concrete floor is troweled. The application of an underlying dry shake layer is followed by spreading over its surface a water soluble silica-based medium prior to and/or during the course of troweling this particular dry shake layer and prior to the application of an overlying dry shake layer.

6 Claims, 6 Drawing Sheets

(56) References Cited

FOREIGN PATENT DOCUMENTS

| | | | |
|---|---|---|---|
| GB | 2331540 B | 3/2002 | |
| JP | 11279439 A | 10/1999 | |
| KR | 101518465 B1 | 5/2015 | |
| KR | 101663519 B1 | 10/2016 | |
| WO | WO-2009134461 A2 * | 11/2009 | ............. C04B 14/00 |
| WO | 2018154890 A1 | 8/2018 | |

OTHER PUBLICATIONS

Chinese Office Action in corresponding Chinese Application No. 201980078696.0 dated Feb. 17, 2023 (12 pages).
Zhou et al; "Research and Development of and Construction with Colored Wear-resistant Floor Dry Powder"; New Building Materials; Nov. 2005; p. 39-41 (11 pages).

* cited by examiner

B

METHOD IN DRY-SHAKE COATING OF A CONCRETE FLOOR

CROSS REFERENCE TO RELATED APPLICATIONS

This application is a U.S. National Stage application of PCT/FI2019/050622, filed Sep. 3, 2019 and published on Jun. 4, 2020 as WO/2020/109650, which claims the benefit of Finnish Patent Application No. 20186027 filed Nov. 30, 2018, all of which are hereby incorporated by reference in their entireties.

FIELD OF THE INVENTION

The invention relates to a method in dry-shake coating of a concrete floor as set forth in the preamble of an independent claim directed thereto.

BACKGROUND OF THE INVENTION

Concrete floors with a dry shake finish, i.e. dry-shake floors, are commonly used in projects where the floor surface is required of abrasion resistance and strength. By reason of benefits obtained thereby, the dry shakes are particularly employed in heavy industrial applications, in which the concrete slabs are subjected to heavy impact and wheel loads and of which is required excellent flatness and abrasion resistance. It is because of these benefits that major advantages are also gained by dry shakes in the case of more lightly loaded concrete floors. Further, especially when using fiber-reinforced concrete, it is by the application of dry shakes that the amount of fibers left on the surface of floor concrete can be reduced for a neater end result.

Dry shakes are floor surface hardeners, which are composed of mixtures of extra hard aggregates, cement and various additives and by which is obtained a surface abrasion resistance as high as fivefold with respect to a surface of just concrete. The dry shake materials have a grain size typically within the range of 0-4 mm and differ from each other in terms of their aggregate materials. Typically employed aggregates include corundum, quartz, metallurgical slag, metal, silicon carbide or combinations of the above. Some products also involve the use of diabase, enabling especially the toughness of a dry shake to be increased.

On the other hand, the cement used in dry shakes is typically one with a high grade of strength. In this regard, it has been a highly common practice to use traditional Portland cement containing 95% Portland clinker and 5% minor additional constituents. In colored dry shakes, Portland cement is replaced with purer-than-that white cement capable of providing a more uniform color result. The hues of dry shakes are produced by using, among others, various inorganic color pigments.

The performance of a dry shake in concrete floor is based on a reaction of the cement within the dry shake with water by virtue of the very strong hydroscopicity of cement, enabling its reaction with water to generate heat and calcium silicate compounds. The cement within a dry shake material reacts with moisture present at the surface of concrete so as to "suck" moisture into itself, whereby, together with mechanical processing of the floor surface, the dry shake material builds a hard, water-insoluble and monolithic structure with the base concrete.

At the start of a dry-shake coating process, it is typically necessary that the cast and floated base concrete be subjected to early aftercare, the purpose being, among other things, to reduce plastic shrinkage in base concrete, to diminish reticular cracking in concrete surface, and to improve bonding of dry shake to substrate. The early aftercare is typically carried out with an early aftercare agent, which, in reference to what is presented in FIG. 1a, is sprayed onto the surface of a base concrete floated after the casting. In this regard, it is also possible to employ a plastic sheet or a filter fabric to be laid on top of the base concrete.

The application of a dry shake is carried out with a separate dispensing machine, a dispensing cart or by using a traditional dry-shake placer. When the application of a dry shake is performed with a dispensing cart or a traditional concrete placer, the surface of base concrete must be floated prior to spreading the dry shake. On the other hand, when the application of a dry shake is carried out with a dispensing machine, it is necessary that spreading of the dry shake be performed immediately over the surface of leveled and vibrated base concrete. Because the surface of base concrete is not in this case opened by troweling, the moisture migrated to the surface of base concrete due to vibration must be sufficient for a dry shake to be applied, which is why spreading of the dry shake must take place as quickly as possible after vibration.

After the application of a first dry shake layer, the dry shake surface must be troweled prior to applying a second dry shake layer thereon. After the second dry shake layer has absorbed moisture in itself from the underlying layer, its surface will be troweled after which the final surface smoothness and density is achieved typically by mechanical steel blade troweling, by using a so-called walk-behind and/or ride-on trowel machine. Steel blade finishing or blade-polishing, must be performed typically at least 2-3 times for providing a floor surface which is dense and for removing small irregularities therein should this be warranted by intended use of the floor.

Aftercare of a dry-shake coated concrete floor must be initiated immediately after completing the final troweling cycle, the purpose being to prevent excessively rapid drying of the base concrete and the dry shake finish and to provide optimal hardening conditions for the dry shake floor. Aftercare can also be used for protecting the floor surface e.g. against knocks and soiling. Aftercare is typically performed with a sprayable aftercare agent, a plastic sheet, a wettable filter fabric, a water spray or a combination of these. The selection of an aftercare method is a result of condition factors as well as the size of an area to be covered.

In practice, the most common problems with dry-shake floors are as follows:
excessively small amount of dry shake (kg/m$^2$),
dry shake has not adhered to base concrete everywhere in a uniform manner (hollow tapping sound),
color differences in dry shake, and
differences in abrasion resistance.
Reasons for the above problems are typically as follows:
excessively low moisture in base concrete,
diverse casting conditions (wind, sunshine, rain),
use of plasticized fresh concrete (in an effort to lower the water/cement-ratio of base concrete),
use of air-entraining agent in fresh base concrete, and
use of blast-furnace slag, fly ash or excessively fine aggregate in fresh base concrete.
In addition, if the white or light-colored dry shake surface is intended to be subsequently diamond-honed or polished for creating sufficient uniformity and gloss, it is highly critical that the amount of a dry shake material be at least 10 k/m$^2$. In case the amount of an employed coating is e.g. 4-6 kg/m$^2$, there is a shake surface being high risk of the dry completely or partially removed in the honing process so to expose the metal fibers of e.g. an SFRC (Steel Fiber Reinforced Concrete) floor. Neither is an excessively thin dry shake surface capable of retaining its color but is discolored owing to the underlying concrete structure while being troweled.

It is an objective of the method according to the present invention to provide a decisive improvement regarding the foregoing problems and to thereby raise substantially the available prior art. In order to attain this objective, the method according to the invention is principally characterized by what has been presented in the characterizing clause of an independent claim directed thereto.

SUMMARY OF THE INVENTION

Most noteworthy important benefits offered by a method of the invention include its simplicity and effectiveness, by virtue of which it is possible to provide in the most diverse of installation conditions and in view of the most demanding of intended applications a dry shake floor optimal in terms of both physical and visual properties thereof. This is enabled by ensuring a mutual bond for the underlying floor structure and each dry shake layer to be spread by applying a silica-based medium on top of the dry shake layer spread over the underlying floor structure and by then troweling the discussed dry shake layer, which first of all impedes evaporation of water from the surface of base concrete or underlying dry shake and secondly seals the surface of the discussed dry shake layer in a manner consistent with an early aftercare agent. Consequently, the bonding of a base concrete or underlying dry shake layer to the next dry shake layer takes place in an overall consistent manner while its surface also remains fresh as the silica-based medium reacts with the excess lime of cement, thereby expediting formation of the surface.

Furthermore, it is by using preferably a nanosilica-based medium, i.e. so-called nanosilica, that a remarkable assistance is provided in terms of the spreading of e.g. three or more superimposed dry shake layers without a risk of inadequate mutual bonding between dry shake layers as the dry shake layers are allowed to moisten n sufficiently and with sufficient uniformity throughout. In particular, the use of nanosilica makes it possible to reach a dry shake dosage as high as 10-15 kg/m², thereby further improving the strength of a dry shake surface and smoothing the color differences yet without increasing the duration of floor surface processing.

A further advantage gained by a silica-based medium in the processing of a dry shake layer is the fact that it does not impair the strength of base concrete as its use does not result in excessive migration of moisture into the base concrete. This is by virtue of the fact that in the above-discussed nanosilica works processing as a so-called primer and reaction accelerator, whereas the use of water in this connection increases a risk of the excessive "contraction" of base concrete and makes the dry shake material difficult to finish while the same time also impairing the abrasion resistance of a presently constructed dry shake surface.

As the method of the invention enables a dry shake layer thickness significantly greater than the present one (typically about 3-6 kg/m²) for a concrete floor, the constructed dry shake floor can also be diamond polished. A common problem in relation to dry shake floors constructed with currently available technology is that the dry shake material will be honed partially or completely in such a way that, because of the translucency of base concrete, the dry shake surface becomes spotted or mottled.

The colloidal silicate liquid contains pure silica in the form of sufficiently small nanoparticles so as to enable its penetration into the pore structures of a dry shake material. The colloidal calcium silicate forms in the pore structures new calcium silicate hydrate (CSH/Calcium Silicate Hydrate), which bonds not only to calcium silicate hydrate present in the previously processed dry shake surface but also to other silicates and to itself. When used in the addition of dry shake layers, the colloidal silica reacts, bonds and thereafter uses the bonded silicate as a growth medium for material layers to be processed later. Other silicate densifiers (such as lithium, sodium and potassium) do not work in a similar fashion, which is why the similar use thereof is not possible when processing dry shake layers on top of each other.

By virtue of the increased layer thickness it is possible to subject a processed dry shake surface to diamond grinding "from deeper" and to achieve a so-called flat mosaic concrete or terrazzo surface, which has not been possible with currently available technology.

When treating the dry shake coating layer/layers with colloidal silica, the compression strength develops more rapidly and the surface density improves because, by virtue of the colloidal silica, there will be no unreacted cement left in the dry shake. This, on the other hand, makes it possible that the dry shake surface be honed as early as 1-7 days after casting. It should be noted in this respect that the honing of ordinary untreated concrete cannot be performed at present earlier than 21-28 days after casting. Other preferred embodiments for a method of the invention have been presented in the dependent claims directed thereto.

BRIEF DESCRIPTION OF THE DRAWINGS

In the following description, the invention will be illustrated in detail while referring to the accompanying drawing, which shows, with a series of FIGS. 1a-1f and by way of one preferred example, various processing stages for a method of invention, wherein.

DETAILED DESCRIPTION OF THE INVENTION

Figure 1A:
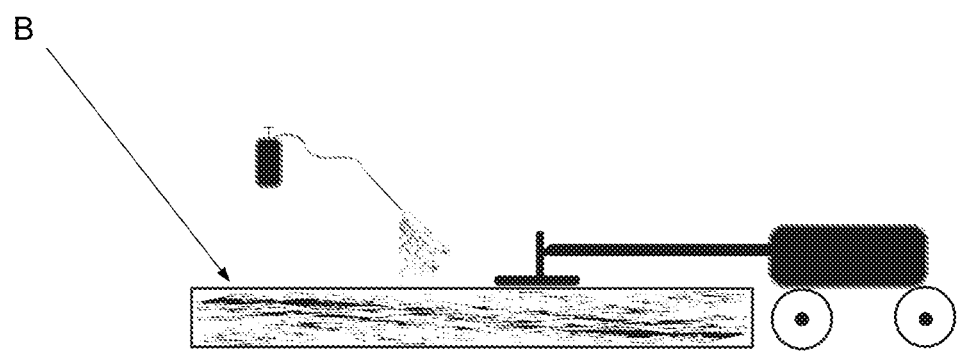
FIG. 1a illustrates an embodiment of application and floating of a fresh concrete subjected to an early aftercare agent.
Figure 1B:
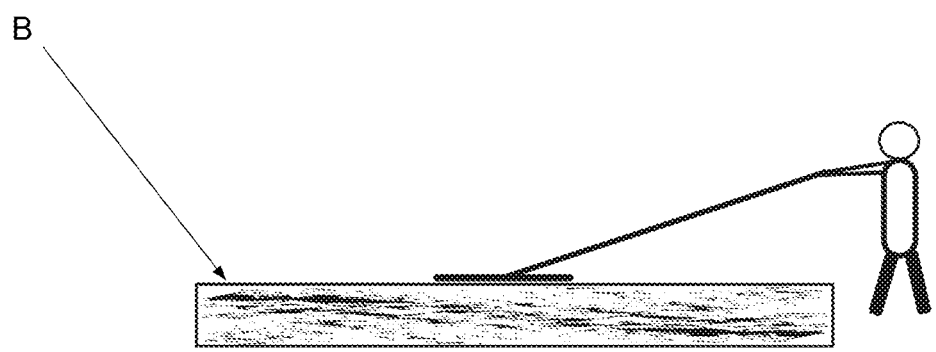
FIG. 1b illustrates another embodiment of the fresh concrete floating.
Figure 1C:
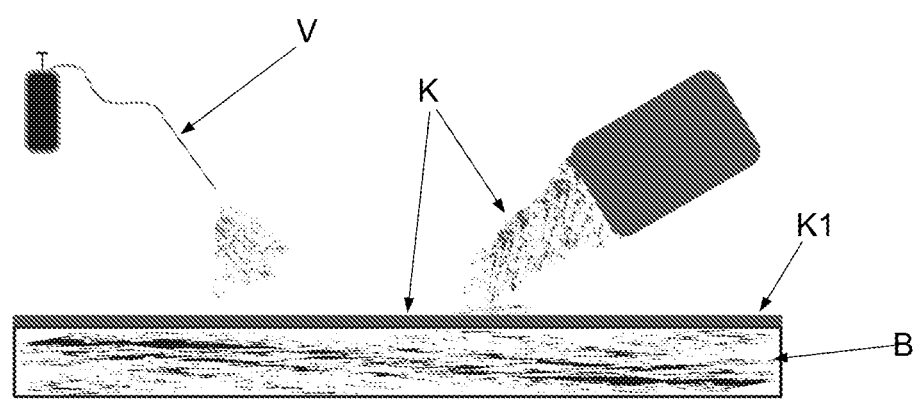
FIG. 1c illustrates application of dry-shake material and silica-based medium.

The invention relates to a method in the dry shake coating of a concrete floor, whereby an applied and, as shown in FIG. 1a, floated fresh floor concrete B is first of all subjected to early aftercare, most preferably by spraying its surface with an early aftercare agent. In this connection, if necessary, after floating the concrete floor, on top of the concrete floor is applied, on a principle appearing from FIGS. 1c and 1e, a dry shake material K for two or more superimposed dry shake layers K1, K2, in which connection the surface of the currently underlying dry shake layer K1 is troweled prior to spreading the next dry shake layer K2 to be processed thereupon. Thereafter, the lastly processed dry shake layer K2 of the concrete floor is troweled and the concrete floor is subjected to actual aftercare, e.g. with an aftercare agent, water spraying, plastic sheet, filter fabric protection, or the like. The application of the underlying dry shake layer K1 is followed by spreading over its surface, on a principle appearing from FIGS. 1c and 1e, a water soluble silica-based medium V prior to and/or during the course of troweling this particular dry shake layer and prior to the application of the overlying dry shake layer K2 to be spread thereupon, which, on the other hand, ensures that excessive underside migration of moisture in the dry shake structure is not allowed to occur yet the applied dry shake layer nevertheless obtains sufficient moisture for its own curing process.

In a preferred embodiment for a method of the invention, the processing of the superimposed dry shake layers K1, K2 is implemented by using the nanosilica-based medium V, it being by virtue of the medium's fineness that optimization of both the homogeneous distribution of moisture in the dry shake layer and the optimal curing of the dry shake structure is achieved.

Figure 1D:
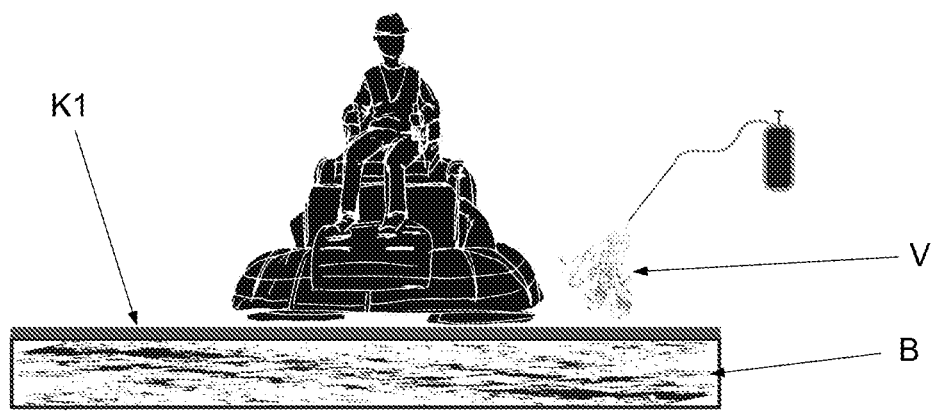
FIG. 1d illustrates power troweling of the first dry-shake layer with silica-based medium.
Figure 1E:
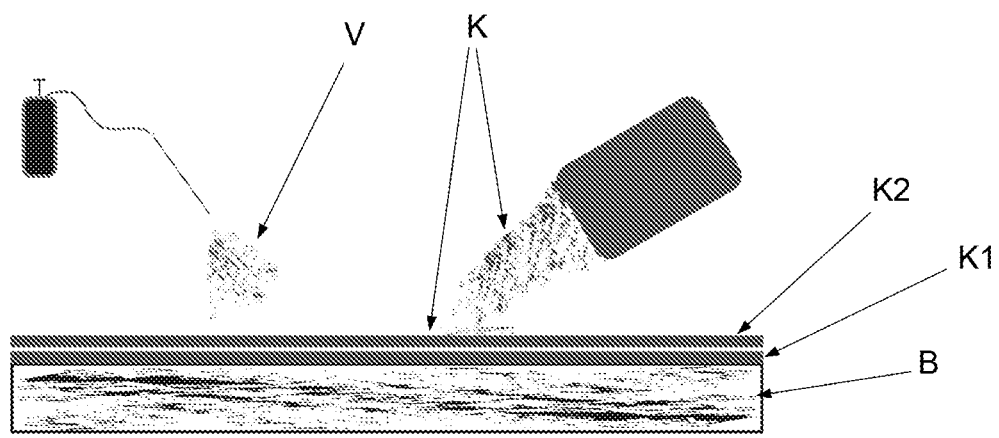
FIG. 1e illustrates application of a second dry-shake layer and the silica-based medium.
Figure 1F:
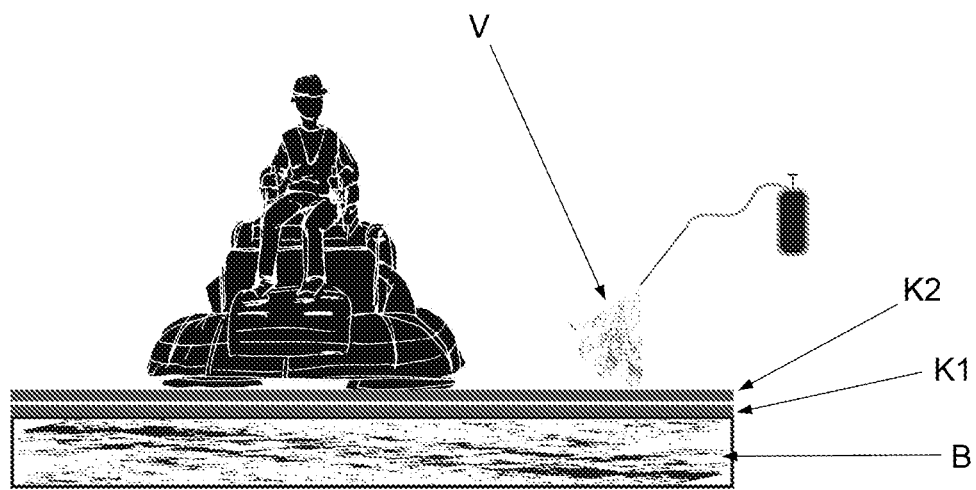
FIG. 1f illustrates power troweling of the second dry-shake layer with silica-based medium.

In a further preferred embodiment of the method, the final dry shake structure of a concrete floor is constructed from three or more layers processed on top of each other, each dry shake layer being treated with the medium V prior to troweling and, as presented in FIGS. 1d and 1f, also during the course of troweling, if necessary, which further enables a dry shake dosage of e.g. 10-15 kg/m$^2$ when assembling the dry shake structure of a concrete floor. Thereby is enabled the construction of a concrete floor featuring a dry shake structure remarkably thicker than those available at present.

In a further preferred embodiment for a method of the invention, the early aftercare of a fresh concrete floor or base concrete B, as presented in FIG. 1a, is conducted by using a water soluble silica- or silicate-based early aftercare agent, whereby the surface of the concrete floor treated therewith is sealed, on a principle shown in FIG. 1b, mechanically with a manual trowel tool such as a bull float or the like.

In a further preferred embodiment for a method of the invention, the actual aftercare of the completed dry shake floor or the subsequently conducted service or maintenance procedure for the dry shake floor is conducted by treating its surface with diamond honing, which, in the case of dry shake floors manufactured with current technology, is not necessarily possible because of a varying or excessively small thickness of the dry shake structure.

It is obvious that the invention is not limited to the above-described or -explained embodiments but can be varied within the basic concept of the invention in a myriad of diverse ways, depending e.g. on current casting conditions, employed concrete mixes and dry shake materials, as well as on properties required of currently constructed concrete floors.

The invention claimed is:

1. A method in dry shake coating of a concrete floor, said method comprising:
    spreading an underlying layer of dry shake material on top of the concrete floor surface;
    spreading a colloidal silica-based medium over the surface of the underlying dry shake layer before and/or during troweling the dry shake layer and before applying a next dry shake layer;
    troweling the surface of the underlying dry shake layer followed by applying the next dry shake layer;
    troweling the lastly spread dry shake layer of the concrete floor; wherein
    the colloidal silica-based medium enhances bonding between sequentially-applied dry-shake layers and enables increasing an overall thickness of the dry shake coating.

2. A method according to claim 1, wherein the medium being spread on the underlying dry shake layer is a colloidal nanosilica-based medium.

3. A method according to claim 2, further comprising spreading water soluble silica-based medium on the concrete floor surface before applying the dry-shake layer.

4. A method according to claim 1, further comprising spreading additional dry shake lavers on top of each other, each layer being treated with a silica and/or nanosilica-based medium before and/or during troweling, wherein the final dry shake structure of the concrete floor comprises three or more dry shake layers.

5. A method according to claim 1, further comprising diamond honing as the actual aftercare of the completed dry shake floor or subsequently conducted service or maintenance procedure for the dry shake floor.

6. A method according to claim 1, further comprising spreading water soluble silica-based medium on the concrete floor surface before applying the dry-shake layer.

* * * * *